(12) United States Patent
Paul et al.

(10) Patent No.: US 8,101,276 B2
(45) Date of Patent: Jan. 24, 2012

(54) PRESSURE SENSITIVE ADHESIVE COMPOSITIONS AND ARTICLES PREPARED USING SUCH COMPOSITIONS

(75) Inventors: Charles W. Paul, Madison, NJ (US); Wu Suen, Flemington, NJ (US)

(73) Assignee: Henkel Corporation, Rocky Hill, CT (US)

( * ) Notice: Subject to any disclaimer, the term of this patent is extended or adjusted under 35 U.S.C. 154(b) by 676 days.

(21) Appl. No.: 12/211,500

(22) Filed: Sep. 16, 2008

(65) Prior Publication Data

US 2010/0068534 A1    Mar. 18, 2010

(51) Int. Cl.
*B32B 27/40* (2006.01)
*B32B 17/10* (2006.01)
*B32B 17/12* (2006.01)
*C08L 83/00* (2006.01)

(52) U.S. Cl. ............ 428/423.1; 428/500; 428/441; 428/447; 428/429; 526/931; 525/100; 525/102

(58) Field of Classification Search ........... 428/423.1, 428/425.6, 441, 447, 500, 429; 526/931; 525/100, 102

See application file for complete search history.

(56) References Cited

U.S. PATENT DOCUMENTS

| | | | |
|---|---|---|---|
| 4,593,068 A | 6/1986 | Hirose et al. | |
| 4,783,504 A | 11/1988 | St. Clair et al. | |
| 4,871,590 A | 10/1989 | Merz et al. | |
| 5,097,053 A | 3/1992 | Baghdachi et al. | |
| 5,210,150 A | 5/1993 | Prejean | |
| 5,331,049 A | 7/1994 | Audett et al. | |
| 5,625,005 A | 4/1997 | Mallya et al. | |
| 5,669,940 A | 9/1997 | Stubbs | |
| 6,121,354 A | 9/2000 | Chronister | |
| 6,197,912 B1 | 3/2001 | Huang et al. | |
| 6,350,345 B1 | 2/2002 | Kotani et al. | |
| 6,433,055 B1 | 8/2002 | Kleyer et al. | |
| 6,437,071 B1 | 8/2002 | Odaka et al. | |
| 6,437,072 B1 | 8/2002 | Jyono et al. | |
| 6,444,775 B1 | 9/2002 | Jyono et al. | |
| 6,613,816 B2 | 9/2003 | Mahdi et al. | |
| 6,642,298 B2 | 11/2003 | Foreman et al. | |
| 6,642,309 B2 | 11/2003 | Komitsu et al. | |
| 6,649,016 B2 | 11/2003 | Wu et al. | |
| 6,664,323 B2 | 12/2003 | Lucas | |
| 6,670,417 B2 | 12/2003 | Foreman et al. | |
| 6,749,943 B1 | 6/2004 | Tangen et al. | |
| 6,777,485 B1 | 8/2004 | Ito et al. | |
| 6,803,412 B2 | 10/2004 | Nguyen-Misra et al. | |
| 6,828,403 B2 | 12/2004 | Mahdi et al. | |
| 6,967,226 B2 | 11/2005 | Shah | |
| 7,067,563 B2 | 6/2006 | Klein et al. | |
| 7,087,127 B2 | 8/2006 | Mahdi et al. | |
| 7,091,298 B2 | 8/2006 | Schindler et al. | |
| 7,153,911 B2 | 12/2006 | Yano et al. | |
| 7,829,116 B2 * | 11/2010 | Griswold et al. | 424/484 |
| 2003/0221770 A1 * | 12/2003 | Meixner et al. | 156/230 |
| 2005/0043455 A1 | 2/2005 | Hohner | |
| 2005/0081993 A1 | 4/2005 | Iikka et al. | |
| 2005/0142357 A1 | 6/2005 | Zajaczkowski et al. | |
| 2006/0142532 A1 | 6/2006 | Wintermantel et al. | |
| 2008/0125539 A1 * | 5/2008 | Mack | 524/588 |
| 2008/0241407 A1 | 10/2008 | Chu et al. | |

FOREIGN PATENT DOCUMENTS

| | | |
|---|---|---|
| EP | 0295330 A2 | 12/1988 |
| GB | 2197326 A | 5/1988 |
| GB | 2292154 A | 2/1996 |
| JP | 60235747 A | 11/1985 |
| JP | 01301740 A | 5/1989 |
| JP | 01163281 A | 6/1989 |
| JP | 02150488 A | 6/1990 |
| JP | 10251357 A | 9/1998 |
| JP | 2000169544 A | 6/2000 |
| JP | 2003193019 A | 7/2003 |
| JP | 2004176028 A | 6/2004 |
| WO | 8911506 A1 | 11/1989 |
| WO | 8911514 A1 | 11/1989 |
| WO | 9106580 A1 | 5/1991 |
| WO | 9108240 A1 | 6/1991 |
| WO | 2008116033 A2 | 9/2008 |

OTHER PUBLICATIONS

Enzcylopedia of Polymer Science and Technology: "Glass Transition" 2006, John Wiley and Sons, p. 14.
Everaerts et al. "Pressure sensitive adhesive" In: Adhesion Science and Engineering-2, Surfaces, Chemistry and Applications, Elsevier Scisnse B.V., 2002, p. 466.

* cited by examiner

*Primary Examiner* — Thao T. Tran
(74) *Attorney, Agent, or Firm* — Sun Hee Lehmann

(57) ABSTRACT

Articles prepared with a pressure sensitive adhesive prepared by combining an acrylic polymer and a silane-functional polymer, such as glass and plastic laminates, show improved impact resistance.

21 Claims, No Drawings

PRESSURE SENSITIVE ADHESIVE COMPOSITIONS AND ARTICLES PREPARED USING SUCH COMPOSITIONS

FIELD OF THE INVENTION

The invention relates to pressure sensitive adhesives. The invention also relates to the use of pressure sensitive adhesives in the manufacture of pressure sensitive adhesive articles and other types of articles, including but not limited to impact resistant articles, prepared using the adhesive or pressure sensitive articles of the invention. The pressure sensitive adhesive used in the practice of the invention is prepared by combining a silane-functional polymer and an acrylic polymer. The compositions of the invention have properties that make them particularly well suited for end use applications requiring high impact resistance.

BACKGROUND OF THE INVENTION

Typical acrylic pressure sensitive adhesive formulations are copolymers of alkyl ester monomers, a functional monomer such as acrylic acid, and may be crosslinked using, for example, aluminum or titanium chelates. These adhesives may be further tackified to improve adhesion on different types of substrates, although usually with limitations in resistance to degradation and aging for most graphics and industrial tape applications in which acrylic solutions are conventionally used.

U.S. Pat. Appl. No. 2005/0142357 discloses a high strength pressure sensitive adhesive comprising a blend of a crosslinked liquid polymer, at least one tackifying resin which is compatible with the liquid polymer, and at least one resin which is incompatible or at least partially incompatible with the liquid polymer. Although the formulated products described in this disclosure provide very high performance at ambient temperature, their high temperature performance will be limited by the Tg of the incompatible phase.

U.S. Pat. No. 5,625,005, No. 6,642,298 and No. 6,670,417 disclose hybrid rubber-acrylic pressure sensitive adhesives described as having good UV resistance and aging characteristics along with high adhesion to non-polar surfaces.

Despite these advancements in the art, there continues to be a need for high performance pressure sensitive adhesives having high adhesion and heat resistance properties that are able to meet higher requirements in applications such as industrial tapes and transfer films. There is also a need for a pressure sensitive product with extremely good performance in other areas, such as impact resistance, that can be used to prepare articles, such as glass/plastic laminates, that will pass the UL-972 Testing for Burglary Resistant Glazing Materials standard. The present invention addresses these needs.

SUMMARY OF THE INVENTION

The invention provides adhesive formulations having outstanding adhesion properties. These performance properties are maintained at high impact speed in their dried state. The invention provides the art with pressure sensitive adhesives that will pass the UL-972 standard when used to bond glass to plastic. The invention also provides the art with pressure sensitive adhesive articles and articles prepared using the pressures sensitive adhesive and articles of the invention, such as high impact resistant articles. Methods of making such articles, in particular articles that pass the UL-972 standard when used to bond a brittle or breakable substrate such as glass to a flexible substrate such as a plastic film are encompassed by the invention.

One embodiment of the invention is directed to articles, including impact resistant articles, manufactured using a pressure sensitive adhesive prepared by combining an acrylic polymer and a silane-functional polymer having a glass transition temperature of below −20° C. In one preferred embodiment, the pressure sensitive adhesive is prepared by combining an acrylic polymer and a silane-functional polymer that contain —$Si(C_xH_{2x-1})_n(OC_yH_{2y+1})_{3-n}$ end groups where n is 0, 1 or 2, and x and y are independently integral numbers of from 0 to 12. In another preferred embodiment, the pressure sensitive adhesive prepared by combining an acrylic polymer and a silane-terminated polyurethane In one embodiment, the acrylic polymer used in the practice of the invention is a pressure sensitive acrylic polymer. In another embodiment the acrylic polymer used in the practice of the invention is one that does not itself contain silane functional groups. In yet another embodiment, the acrylic polymer used in the practice of the invention is prepared from monomers comprising (i) acrylate monomers, homopolymers of which have a glass transition temperature less than 0° C., which acrylate monomers contain from about 4 to about 18 carbon atoms in the alkyl group and (ii) monomers, homopolymers of which have a glass transition temperature greater than 0° C. Monomers used to prepare the acrylic polymer may also desirably include acid containing monomers and/or hydroxy containing monomers. In one embodiment, the acid functional monomer is acrylic acid. Useful acrylic polymers include, for example, acrylic polymers prepared from 2-ethyl hexyl acrylate, acrylic acid, and vinyl acetate or methyl acrylate. In one preferred embodiment, the acrylic polymer comprises 2-ethyl hexyl acrylate, methyl acrylate and acrylic acid.

Encompassed articles include articles comprising a glass substrate bonded to a plastic film. In one preferred aspect, the plastic film is a plastic laminate. Impact resistant glass laminates used, for example in windows, doors, partitions, picture glass, show case panels, and storefronts are included.

Another embodiment of the invention is directed to methods of preparing articles or products having high impact resistance. The method comprising applying a pressure sensitive adhesive to at least a first substrate, the pressure sensitive adhesive prepared by combining an acrylic polymer and a silane-functional polymer, and bringing at least a second substrate in contact with the adhesive applied to the first substrate. The substrates may be the same or different. In one embodiment, both the first and the second substrates are both transparent and clear.

High impact resistant articles/products include impact resistant laminates, in particular laminates made by bonding a brittle or breakable surface to a flexible facestock. Nonlimiting examples of high impact resistant articles prepared using the method of the invention include windows for homes, storefronts such as convenience stores, automobiles, and sliding glass doors, LCD displays, display cabinets, and the like.

Preparation of High Impact Resistance Products Using the Method of the Invention provides the art with a method of preparing burglary resistant products, such as high impact resistant windows, doors and show cases, that will pass the UL-972 testing standard. High impact products comprising a glass substrate bonded to a plastic substrate such as a polyester film. The plastic films used may desirably be plastic film laminates bonded together, preferably, with the adhesive of the invention. In one embodiment the laminate comprises two glass substrates and one or more interlays of a plastic film. Such may be used in the manufacture of windows, doors, partitions, show case panels, storefronts and the like.

The invention also provides the art with novel pressure sensitive adhesives.

In one embodiment, the adhesive of the invention is prepared by combining a pressure sensitive acrylic polymer with a silane-functional polymer.

In another embodiment, the adhesive of the invention is prepared by combining an acrylic polymer with a silane-functional polymer, wherein the acrylic polymer used lacks silane-functional groups.

In still another embodiment, the adhesive of the invention is prepared by combining an acrylic polymer with a silane-functional polymer, wherein the silane-functional polymer is a silane terminated polyurethane.

The pressure sensitive adhesives of the invention may be used to prepare pressure sensitive articles such as tapes and labels, and, as described above, may advantageously be used to laminate a breakable substrate, such as glass, to flexible facestock material, such as a plastic film to prepare impact resistant glass laminates.

The novel pressure sensitive adhesives of the invention may advantageously be used in the manufacture of adhesive articles including, but not limited to, industrial tapes and transfer films. Single and double face tapes, as well as supported and unsupported free films are encompassed by the invention. Also included, without limitation, are labels, decals, name plates, decorative and reflective materials, reclosable fasteners, theft prevention and anti-counterfeit devices. The adhesive and adhesive articles may advantageously, as described above, be used to prepare other types of articles, including but not limited to articles requiring impact resistance.

DETAILED DESCRIPTION OF THE INVENTION

The disclosures of all documents cited herein are incorporated in their entireties by reference.

As used herein, the term "pressure-sensitive adhesive" refers to a viscoelastic material which adheres instantaneously to most substrates with the application of slight pressure and remains permanently tacky. A polymer is a pressure-sensitive adhesive within the meaning of the term as used herein if it has the properties of a pressure-sensitive adhesive per se or functions as a pressure-sensitive adhesive by admixture with tackifiers, plasticizers or other additives.

An accepted quantitative description of pressure sensitive polymers and adhesives is given by the "Dahlquist Criterion" that relates modulus data to tack-temperature studies. Materials that have a storage modulus (G') of less that about $3 \times 10^5$ Pascal (measured at 10 radians/second at a temperature of about 20° C. to about 22° C.) have pressure sensitive adhesive properties. A second criterion for pressure sensitivity is that the glass transition temperature of the material be below the use temperature, which is usually room temperature. Generally, the Tg will be about 30 to 70° C. below room temperature, depending on the base polymer and any added modifiers. See, Everaerts and Clemens, Chapter 11, "Pressure sensitive adhesive" In: Adhesion Science and Engineering—2, Surfaces, Chemistry and Applications, Eds., Chaudhury and Pocius, pp. 466.

It has been discovered that certain types of adhesives, when used in the manufacture of glass/plastic laminates, produce laminates that show a minimum amount of delamination of a glass substrate from a polyester facestock following impact. The pressure sensitive adhesive used in the practice of the invention bonds strongly under a very high speed delamination process, i.e., about 0000× fold higher than regular peeling test speed of 12"/min. Current pressure sensitive adhesive products used for this application do not give satisfactory results when tested by the UL-972 standard.

The adhesive polymer used in the practice of the invention is prepared by combining an acrylic polymer and silane-functional polymer. In one embodiment, the acrylic polymer is a pressure sensitive adhesive polymer. In another embodiment, the acrylic polymer is a non-silylated acrylic polymer. In one embodiment the silane-functional polymer is a silane terminated polyurethane. In another embodiment, the silane-functional polymer is a polymer that comprise a silane or silyl end group represented by $Si(C_xH_{2x+1})_n(OC_yH_{2y-1})_{3-n}$, wherein n=0, 1 or 2; and x and y are, independently, integral numbers from 1 to 12, linked to a polymer backbone.

The acrylic polymer backbone used in the practice of the invention may be formed by polymerizing acrylate monomers of one or more low glass transition temperature (Tg) alkyl acrylates. Low Tg monomers are those having a Tg of less than 0° C. Preferred alkyl acrylates which may be used to practice the invention have up to about 18 carbon atoms in the alkyl group, preferably from about 4 to about 10 carbon atoms in the alkyl group. Useful alkyl acrylates include butyl acrylate, amyl acrylate, hexyl acrylate, 2-ethylhexyl acrylate, isooctyl acrylate, decyl acrylate, dodecyl acrylates, isomers thereof, and combinations thereof. One preferred alkyl acrylate for use in the practice of the invention is 2-ethyl hexyl acrylate.

The monomer system used to make the acrylic backbone polymer may include high Tg monomers (i.e., a Tg greater than 0° C.) and may also include functional comonomers, in particular carboxy-containing functional monomers and/or hydroxy-containing functional monomers.

High Tg monomer components include vinyl acetate, methyl acrylate, ethyl acrylate, isobutyl methacrylate and combinations thereof. The high Tg monomers may be present in a total amount of up to about 50% by weight, preferably from about 5 to about 50% by weight, more typically from about 10 to about 40% by weight, based on total weight of the acrylic polymer.

As described above, the acrylic backbone polymer may also comprise one or more functional monomers. Preferred are carboxy and/or hydroxy functional monomers. While the acrylic polymer may itself contain silane-functional groups, in one embodiment, the acrylic polymer used to prepare the adhesive does not contain silane-functional groups.

Carboxy functional monomers, when used, will typically be present in the polymer in an amount of up to about 10% by weight, more typically from about 1 to about 6% by weight, based on the total weight of the monomers. Useful carboxylic acids preferably contain from about 3 to about 5 carbon atoms and include acrylic acid, methacrylic acid, itaconic acid, and the like. Acrylic acid, methacrylic acid and mixtures thereof are preferred.

Hydroxy functional monomers include hydroxyalkyl (meth)acrylate esters, and acrylic polymers used to form the backbone of the invention are preferably acrylic ester/hydroxy (meth)alkyl ester copolymers. Specific examples of hydroxy functional monomers include hydroxyethyl acrylate, hydroxypropyl acrylate, hydroxyethyl methacrylate and hydroxypropyl methacrylate. When used, hydroxy functional monomers will generally be present in an amount of from about 1 to about 10%, preferably from about 3 to about 7%.

Other comonomers can be used to modify the Tg of the acrylic polymer, to further enhance adhesion to various surfaces and/or to further enhance high temperature shear properties. Such comonomers include N-vinyl pyrrolidone, N-vinyl caprolactam, N-alkyl (meth)acrylamides such as t-octyl acrylamide, vinyl esters such as vinyl neodecanoate, cyanoethylacrylates, diacetoneacrylamide, N-vinyl acetamide, N-vinyl formamide, glycidyl methacrylate and allyl glycidyl ether.

The monomer proportions of the acrylic polymer will typically be adjusted in such a way that the backbone polymer has a glass transition temperature of less than about −10° C., and more preferably from about −20° C. to about −60° C.

In one particularly preferred embodiment the acrylic polymer is prepared using 2-ethylhexyl acrylate or similar low Tg acrylic monomer, vinyl acetate or similar high Tg monomer, and also a carboxylic acid functional monomer such as acrylic acid or hydroxy functional monomer such as hydroxyethyl acrylate.

Silane functional polymers that may be used in the practice of the invention will preferably have a molecular weight range of from about 2,000 to about 100,000. In one embodiment the silane functional polymers will have a glass transition temperature of about −20° C. or less, as determined by differential scanning calorimetry (DSC) using a scan rate of 20° C./min and taking the inflection point of the baseline shift as the measure of Tg. In another embodiment the silane-functional polymers have a glass transition temperature of about −30° C. or less, as determined by DSC. In yet other embodiments the silane-functional polymers will have a glass transition temperature of from about −50° C. to about −70° C. or less, as determined by DSC. The silane-functional polymers will typically be present in an amount of from about 1 to about 95 percent by weight of the adhesive polymer of the invention, preferably from about 5 to about 50%, and more typically from about 10 to about 30% by weight.

Useful silane functional polymers include silane-terminated polyurethanes. Silane-terminated polyurethanes that can be used in the practice of the invention may be obtained, for example: (i) from the reaction of an isocyanto-terminated polyurethane prepolymer with an organofunctional silane containing active hydrogens, such as an amino-silane, that can react with isocyanate and thus link to the prepolymer; (ii) from the reaction of a polyol with an isocyanatosilane; and (iii) from the reaction of a hydroxyl terminated polyurethane prepolymer with an isocyanatosilane. (The starting polyurethane prepolymers with hydroxyl or isocyanato termination are obtained by reacting polyols with polyisocyanates using an excess of equivalents of hydroxyl or isocyanate groups respectively.) Mixtures of (i) and/or (ii) and/or (iii) may also be used in the practice of the invention.

Suitable polyols that can be used to make the silane terminated polyurethanes include polyoxyalkylene diols (especially polyethylene glycol, polypropylene glycol, polytetramethylene glycol), polyoxyalkylene triols, polycaprolactone diols and triols, and the like. Other polyol compounds, including tetraols thereof, may also be used, including pentaerythritol, sorbitol, mannitol and the like. Preferred polyols used in the present invention are polypropylene glycols with equivalent weights in the range of from about 500 to about 50,000; preferably, between about 2000 and 30,000. Mixtures of polyols of various structures, molecular weights and/or functionalities may also be used.

Suitable polyurethane prepolymer intermediates include any from polyurethane polymers that can be prepared by the chain extension reaction of polyols with diisocyanates. Useful diisocyanates include, for example, 2,4-toluene diisocyanate; 2,6-toluene diisocyanate; 4,4'-diphenyl-methanediisocyanate; isophorone diisocyanate; dicyclohexylmethane-4, 4'-diisocyanate; various liquid diphenylmethanediisocyanates containing a branch or a mixture of 2,4- and 4,4' isomers and the like, and mixtures thereof.

Silane endcappers suitable for endcapping of isocyanate terminated urethane prepolymers are represented by the general formula:

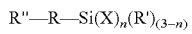

wherein R is a divalent alkylene group; R' is alkyl or aryl, preferably having from 1 to 8 carbon atoms, X is a hydrolyzable alkoxy, or alkyloximido group, preferably having from 1 to 4 carbon atoms; and n is an integer from 1 to 3. Group R" is an organo-functional group, which can react with either isocyanato or hydroxyl terminated polymers, such as isocyanato, primary or secondary hydroxyl, amino, mercapto, or ureido functional groups.

A more detailed description of methods to prepare silane terminated polyurethane may be found in U.S. Pat. No. 6,197,912 and U.S. Pat. Appl No. application 2006/0142532. Silane-terminated polyurethanes are commercially available from chemical companies such as Bayer, Wacker, Momentive Performance Materials Inc. and Henkel Co and KGaA.

Other useful silane functional polymers are polymers that comprises a silane or silyl end group represented by $Si(C_xH_{2x+1})n(OC_yH_{2y+1})_{3-n}$, wherein n=0, 1 or 2; and x and y are, independently, integral numbers from 1 to 12, linked to a polymer backbone, whose backbone composition include, but is not limited to, polyether, aliphatic polyolefin, polyacrylate, polyurethane, EVA, SBS, SIS. Examples of end groups include, but are not limited, to trimethoxy —$Si(OCH_3)_3$, triethoxy-$Si(OC_2H_5)_3$, methyl dimethoxy-$Si(CH_3)(OCH_3)_2$ etc. These types of silane-functional polymers, such as SAX 725 and MAX 951, are commercially available from Kaneka Co.

Preferred for use are adhesive compositions that have been crosslinked using a chemical crosslinking agent. The use of aluminum crosslinking agents may be used to practice the invention. Titanium containing metal alkoxide may also be used as crosslinking agent. The crosslinker is typically added in an amount of from about 0.3% to about 2% by weight of the polymer in final product.

The adhesive compositions used in the practice of the invention may, optionally, be tackified. Tackifiers that are compatible with the acrylate polymer can be used. Non-limiting examples include polar tackifiers such as terpene phenolics such as Sylvares TP300 and TP96, and rosin esters such as Sylvalite RE80HP, etc., all available from Arizona Chemical Co. Non-polar tackifier may also be used to improve adhesion on low surface energy substrate. The tackifying resin will normally be present at a level of 0 to 60% by weight of the adhesive composition.

The formulated adhesive may also include, diluents, plasticizers, antioxidants, UV stabilizers, adhesion promoters, anti-irritants, fillers, such as clay and silica, pigments and mixtures thereof, excipients, preservatives, as well as other components or additives.

In one preferred embodiment, the adhesive is prepared by combining a silane-functional polymer and an acrylic polymer prepared using 2-ethylhexyl acrylate or similar low Tg acrylic monomer, vinyl acetate or similar high Tg monomer, and preferably also a carboxylic acid functional monomer or hydroxy functional monomer such as acrylic acid or hydroxyethyl acrylate.

The pressure sensitive adhesives described herein may advantageously be used in the manufacture of adhesive articles including, but not limited to, industrial tapes and transfer films, including both single and double face tapes, as well as supported and unsupported free films. Also included, without limitation, are labels, decals, name plates, decorative and reflective materials, reclosable fasteners, theft prevention and anti-counterfeit devices. Articles requiring impact resistance may advantageously be manufactured using the described pressure sensitive adhesive as a laminating adhesive to bond breakable or otherwise brittle substrates such as glass to flexible substrates made of, e.g., polymer films such as polyvinyl butylral (PVB), polypropylene, polyamide and polyester. Included are LCD displays, plate glass for use in windows, doors, partitions and the like for commercial and residential uses. The adhesive is advantageously used in end use applications where the manufacture article is subjected to vibration, stress or is vulnerable or prone to impact.

The invention provides laminated glass panels and panes that are able to pass the Underwriters Laboratory test standard UL 972. This test considers the ability of a laminated glass to resist burglary or forced entry (e.g., "smash and grab" type burglaries). The test consists of dropping a 3.25 inch, 5 lb (2.25 kg) steel ball through a designated vertical distance onto a sample measuring 24 in by 24 in (61 cm×61 cm). Resistance is determined by whether the steel ball, after 5 impacts per sample, is able to penetrate the laminate. It will be appreciated that when impacted or otherwise or attacked, the glass unit will crack. The structural integrity once the glass is cracked becomes dependent on the plastic layer of the laminate. In one preferred embodiment, the polymer film used will be a plastic film laminate of 2 or more film layers, more preferable 3 or more film layers bonded together using the adhesive of the invention. Individual films within the film laminate may be of the same, or may be of different thicknesses. Individual films used to prepare the film laminate will generally range from about 2 to about 10 mils. The adhesive will typically be applied in the 0.5 mil to 3 mils range.

While glass laminates are tested and rated in the industry by Underwriters Laboratory according to standards set forth in UL-972, in the following test examples impact resistance was measured by a Pendulum Impact Tester using the procedure described below.

EXAMPLES

In the following examples, the following adhesive test methods were used.
Preparation of Coatings:

The adhesive solutions were cast on a silicone coated release liner, air dried for 15 minutes, and then dried for 3 minutes at 250° F. in a forced air oven. The films were then laminated to a backing film and conditioned overnight at 22° C. and 50% relative humidity. Unless otherwise indicated the dried adhesive film thickness was 1 mil (25 microns) and the backing film was 2 mil PET (polyethylene terephthlate) film.
Peel Adhesion:

Peel adhesion at 180° between the backing and the adherend test panel was measured according to Test Method number 1 of the Pressure Sensitive Tape Council (PSTC), Northbrook, Ill., adapted as follows. The peel strength was measured after wetting out a stainless steel (SS) test panel for 20 minutes or as otherwise indicated. The testing was also carried out on high density polyethylene (HDPE) test panels. Unless otherwise indicated, all testing was performed at 22° C. and 50% relative humidity.
Shear Holding Power:

Shear holding power was measured according to PSTC Test Method number 7, adapted as follows. The holding power was measured under a shear load of 1 kg on a 0.5 inch wide by 1 inch long area, applied after wetting out the test panel for 15 minutes. Unless otherwise indicated, all testing was performed at 22° C. and 50% relative humidity.
Hot Shear:

Shear Holding was also measured at elevated temperature conditions. 5 lb weight with 1"×1" overlap area. Samples conditioned at 150° F. for 15 minutes before applying weight.
Impact Resistance:

As noted above, the industrial standard, UL 972 for Burglary Resisting Glazing material, consists of multiple impact tests wherein a 5 lb steel ball is dropped onto 2'×2' laminated glass substrate over different distances (8-40 feet) and under different temperatures (−10 to 49° C.).

The ideal pressure sensitive adhesive (PSA) adhesive used in this laminate will lead to minimum amount of delamination of glass from polyester facestock. This requirement translates into a strong bonding of PSA under very high speed delamination process, about 10000× fold higher than regular peeling test speed of 12"/min.

To screen the impact resistance of PSA, a Pendulum Impact tester, with a 2.5 lb metal ball dropping in pendulum motion over 2 feet in perpendicular distance. The laminated glass test panel consisted of 0.25 inch thick glass bonded with the adhesive sample to a PET laminate consisting of three films bonded together with the same adhesive sample. The percentage of PET film delaminated from glass plate was measured after the collision, less of which indicates a better impact resistance of the product. Broken glass pieces that remained attached to PET film, with minimum amount of delamination taking place had better impact resistance.

The following abbreviations are in the Examples and Tables.
2-EHA: 2-ethylhexyl acrylate
MA: methyl acrylate
VAc: vinyl acetate
Veova-10: vinyl neodecanoate
AA: acrylic acid
GMA: glycidyl methyacrylate
Silquest A-187: γ-glycidoxypropyltrimethoxysilane
Spur+1050 mM: silylated polyurethane resin based on polypropylene glycol from Momentive Performance Materials Inc.
Max 951: a silyl-terminated polyether with silyl-modified acrylics from Kaneka Co.
Al(acac)$_3$: aluminum acetylacetonate
SAX 725: silyl terminated polyether from Kaneka Co.
Sylvares TP300: terpene phenolic tackifier resin from Arizona Chemical Co.
AF: adhesive failure to substrate
CF: cohesive failure
SS: stainless steel substrate Example 1

Acrylic Polymer Sample A was Prepared as Follows

An initial charge mixture containing 8.95 g 2-ethylhexyl acrylate (2-EHA), 19.14 g Vinyl Acetate (VAc), 0.57 g of Acrylic Acid (AA), 9.64 g ethyl acetate (EtOAc), 13.06 g heptanes (a standard mixed isomer grade), and 0.048 g azobis (isobutyronitrile) (AIBN) was prepared and charged to a 3 liter 4-neck round bottomed flask equipped with stainless steel stirrer, thermometer, condenser, water bath, and slow addition funnels. The initial charge was heated to reflux while stirring. After 10 minutes at reflux a monomer mix containing 62.38 g 2-EHA, 8.94 g Acrylic Acid and an initiator mix containing 5.93 g EtOAc, 7.62 g heptanes, 0.24 g AIBN were simultaneously, separately, and uniformly added over a period of 2 hours and 3 hours, respectively. At the end of the additions the flask contents were held at reflux for a further 2 hours. Next the residual monomers were scavenged using a short half-life initiator added over a one hour period and the solution was held under reflux for a further hour. Then diluent consisting of 28.30 g Heptanes, 43.15 g of Isopropanol (IPOH) and 10.66 g of Xylene were slowly added to the reactor contents while cooling the contents to room temperature. The polymer solution maintained a fluid viscosity throughout the process and showed no tendency to climb the reactor stirring shaft.

The polymer solution had a solids content of 43.18% and a Brookfield viscosity of 2924 cps. The molecular weight averages, determined by gel permeation chromatography, were $M_w=422,349$ and $M_n=82,098$.

Acrylic polymer samples B-F were prepared in a similar way as sample A. Samples A-F were used as base polymers to make the adhesive formulations, the composition in percent by weight and physical properties of the acrylic polymer samples are shown in Table 1.

TABLE 1

|  | A | B | C | D | E | F |
|---|---|---|---|---|---|---|
| Composition |  |  |  |  |  |  |
| % 2-EHA | 71.3 | 61.8 | 74.9 | 74.9 | 74.9 | 74.9 |
| % MA |  | 32.4 |  |  |  |  |
| % Vac | 19.2 |  | 20.1 | 10 | 7.5 | 20.1 |
| % Veova-10 |  |  |  | 10.1 | 7.6 |  |
| % AA | 9.5 | 5.6 | 5 | 5 | 10 | 5 |
| % GMA |  | 0.2 |  |  |  | 0.1 |
| Properties |  |  |  |  |  |  |
| Solids % | 43.18% | 42.50% | 53.20% | 53.50% | 42.30% | 54.70% |
| Viscosity (cps) | 2924 | 5000 | 9380 | 4856 | 818 | 4700 |

Example 2

This example described the performance improvements in peel adhesion and shear holding when using an adhesive formulation made by combining a silane functional polymer and an acrylic polymer. SPUR+ 1050 mM and Spur+ 1015 LM, available from Momentive Performance Materials Inc., are organofunctional silane terminated polyurethane prepolymers. In Table 2, formulation A-1 served as control and comprised of 100 parts of acrylic polymer A and 0.6 part of Al(acac)$_3$ as crosslinking agent and coated as described above. Its peel adhesion after 20 min dwell time on stainless steel substrate was 73.7 oz/in, with hot shear holding of 0.21 hour. In formulation A-2, 100 parts of polymer A were combined with 10 parts of silane functional polymer Spur+1050 mM with 0.4 part of Al(acac)$_3$ as crosslinking agent and coated as described above. Its peel adhesion after 20 min dwell time on stainless steel substrate was 80 oz/in, with hot shear holding of 0.6 hour. These values were significantly better than those of formulation A-1. Similar results were obtained using formulation A-3.

TABLE 2

|  | A-1 | A-2 | A-3 | A-4 | B-1 | B-2 | B-3 |
|---|---|---|---|---|---|---|---|
| Composition |  |  |  |  |  |  |  |
| Acrylic polymer | A | A | A | A | B | B | B |
| Amount | 100 | 100 | 100 | 100 | 99.65 | 54.65 | 54.65 |
| Spur + 1050MM |  | 10 | 10 |  |  | 20 |  |
| MAX951 |  |  |  | 10 |  |  |  |
| SAX725 |  |  |  |  |  |  | 20 |
| Sylvares TP300 |  |  |  |  |  | 50 | 50 |
| Al(acac)3 | 0.6 | 0.4 | 0.6 | 0.6 | 0.35 | 0.35 | 0.35 |
| Silquest A-187 |  |  |  |  |  |  | 2 |
| Peel (2 mil PET) |  |  |  |  |  |  |  |
| 20 min SS (oz/in) | 73.7 AF | 80 AF | 76 AF | 80.8 AF | 64.4 AF | 92.4 AF | 98.7 AF |
| Hot Shear (hour) | 0.21 | 0.6 | 1.8 | 0.1 | 7.4 | 7.6 | 8.1 |

Similarly, formulation B-1 served as control and comprised of 99.65 parts of acrylic polymer B and 0.35 part of Al(acac)₃ as crosslinking agent and coated as described above. Its peel adhesion after 20 min dwell time on stainless steel substrate is 64.4 oz/in, with hot shear holding of 7.4 hours. In formulation B-2, 54.65 parts of polymer B were combined with 20 parts of Spur+1050 mM with 0.35 part of Al(acac)₃ as crosslinking agent, 50 parts of Sylvares TP300 as tackifier and coated as described above. Its peel adhesion after 20 min dwell time on stainless steel substrate was 92.4 oz/in, significantly better than those of formulation B-1. Similar results were obtained using formulation B-3 where silane functional polymer SAX 725 from Kaneka Co. was used to combine with polymer B.

Comparative Example 1

Different approaches were used in order to improve the impact resistance, including using more low Tg monomer as comonomer, adding polar functional monomer to increase specific adhesion, adding functional monomer, etc. The composition of acrylic Samples C to F are shown in Table 1. These polymers were formulated with Al(acac)₃ crosslinker as A-1, and tested with their performance shown in Table 3.

TABLE 3

| Peel (oz/in) | C | D | E | F |
| --- | --- | --- | --- | --- |
| 20 min | 55.1 AF | 54.0 AF | 77.9 AF | 55.2 AF |
| 24 hour | 64.2 AF | 62.3 AF | 126.7 CF | 68.3 AF |
| 1 week | 75 AF | 90.5 AF/CF | 123.0 CF | 90.1 AF |
| Shear (hours) | 128.5 | 84.5 | 56.9 | 21.5 |
| Glass delamination after collision | 20-25% | 13-20% | 40-45% | 15-20% |

Acrylic sample C was used as the control product. Batches D-F were modifications based on the control sample. In spite of better peel adhesion shown by these polymers in comparison to the control C, none of them gave significant improvement in pendulum screening test as indicated by large percentage of glass delamination after the collision.

Example 3

Low Tg silane-terminated polyurethanes Spur+1050MM and 1015LM were combined with control polymer C. The amounts are shown in Table 4 (parts per hundred), along with performance in pendulum screening test and peel, shear results.

TABLE 4

|  | C-1 | C-2 | C-3 | C-4 |
| --- | --- | --- | --- | --- |
| Composition |  |  |  |  |
| Base Polymer | C | C | C | C |
| Amount | 100 | 100 | 100 | 100 |
| SPUR + 1050MM | 14.3 | 33.3 |  |  |
| SPUR + 1015LM |  |  | 14.3 | 14.3 |
| Al(acac)3 | 0.7 | 0.8 |  | 0.7 |
| Tyzor GBA |  |  | 1.7 |  |
| Peel (ozf/in) |  |  |  |  |
| 20 min | 26.2 AF | 21.6 AF | 32.6 AF | 29.3 AF |
| 24 hour | 60.8 AF | 42.8 AF | 10.6 AF | 42.9 AF |
| 1 week | 72 AF | 67.2 AF | 51.4 AF | 63.3 AF |
| Shear (hours) | >800 | >800 | >800 | >800 |
| Glass delamination after collision | 3% | 2% | 3% | 5% |

From the results shown in Table 4, it can be seen that by combining these silane-functional polymers with an acrylate pressure sensitive adhesive polymer, impact resistance was greatly improved (2-5% glass delamination compared to ~20% delamination of control product). Peel results at 20 minutes decreased to various degrees, but increased to a level comparable to control over time. Also the shear holding results increased to an extraordinarily high level.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A high impact resistant article comprising a breakable substrate bonded to a flexible substrate,
    wherein the breakable substrate is bonded to the flexible substrate using a pressure sensitive adhesive prepared by combining a nonsilylated acrylic polymer and a silane-functional polymer,
    wherein the silane-functional polymer is a silane-terminated polyurethane prepared from polyoxyalkylene diol, polyoxyalkylene triol, polycaprolactone diol or polycaprolactone triols; and said silane-terminated polyurethane has a glass transition temperature of below −20° C.

2. The article of claim 1 wherein the silane-functional polymer is a polymer that contains —Si($C_xH_{2x+1}$)$_n$($OC_yH_{2y+1}$)$_{3-n}$ end groups where n is 0, 1 or 2, and x and y are independently integral numbers from 0 to 12.

3. The article of claim 1 wherein the silane-terminated polyurethane is prepared from polyoxyalkylene diol.

4. The article of claim 3 wherein the polyoxyalkylene diol is selected from the group consisting of polyethylene glycol, polytetramethylene glycol and polypropylene glycol.

5. The article of claim 1 wherein the breakable substrate is a glass substrate.

6. The article of claim 5 comprising a glass substrate bonded to a plastic film.

7. The article of claim 6 where the plastic film is a plastic laminate.

8. The article of claim 6 wherein the plastic film is sandwiched between two glass substrates.

9. The article of claim 6 which is an impact resistant window, door or display case.

10. The article of claim 1 wherein the pressure sensitive adhesive comprises a silane-functional polymer has a glass transition temperature of below −50° C.

11. The article of claim 1 wherein the acrylic polymer is a pressure sensitive nonsilylated acrylic polymer.

12. The article of claim 1 wherein the pressure sensitive adhesive comprises an acrylic polymer prepared from monomers comprising
    (i) acrylate monomers, homopolymers of which have a glass transition temperature less than 0° C., which acrylate monomers contain from about 4 to about 18 carbon atoms in the alkyl group and
    (ii) monomers, homopolymers of which have a glass transition temperature greater than 0° C.

13. The article of claim 12 wherein the monomers used to prepare the acrylic polymer comprise acid functional monomers and/or hydroxy functional monomers.

14. The article of claim 13 wherein the pressure sensitive adhesive comprises an acrylic polymer prepared from 2-ethyl hexyl acrylate, acrylic acid, and vinyl acetate or methyl acrylate.

15. A pressure sensitive adhesive prepared by combining an acrylic polymer and a silane-functional polymer
   wherein the silane-functional polymer is a polyurethane prepared from polyoxyalkylene diol, polyoxyalkylene triol, polycaprolactone diol or polycaprolactone triol; and said silane-terminated polyurethane has a glass transition temperature of below −20° C. and contains —Si($C_xH_{2x+1}$)$_n$(O$C_yH_{2y+1}$)$_{3-n}$ end groups where n is 0, 1 or 2, and x and y are independently integral numbers from 0 to 12 and
   wherein the acrylic polymer contains no silyl functional groups.

16. A pressure sensitive adhesive prepared by combining a nonsilylated acrylic polymer and a silane functional polymer wherein the silane functional polymer is a silane-terminated polyurethane prepared from polyoxyalkylene diol, polyoxyalkylene triol, polycaprolactone diol or polycaprolactone triol; and silane-terminated polyurethane has a glass transition temperature of below −20° C.

17. The adhesive of claim 16 wherein the silane-functional polymer has a glass transition temperature of below −50° C.

18. A pressure sensitive adhesive article comprising the adhesive of claim 16.

19. The article of claim 18 which is a tape, film or label.

20. The adhesive of claim 15 wherein the silane-functional polymer has a glass transition temperature of below −50° C.

21. A pressure sensitive adhesive article comprising the adhesive of claim 15.

* * * * *